(12) United States Patent
Okuno

(10) Patent No.: US 10,528,857 B2
(45) Date of Patent: Jan. 7, 2020

(54) IC CARD, PORTABLE ELECTRONIC DEVICE, AND INFORMATION PROCESSING METHOD

(71) Applicants: Kabushiki Kaisha Toshiba, Minato-ku (JP); Toshiba Infrastructure Systems & Solutions Corporation, Kawasaki-shi (JP)

(72) Inventor: Tomotaka Okuno, Tokyo (JP)

(73) Assignees: Kabushiki Kaisha Toshiba, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 16/199,466

(22) Filed: Nov. 26, 2018

(65) Prior Publication Data

US 2019/0095771 A1    Mar. 28, 2019

Related U.S. Application Data

(63) Continuation of application No. PCT/JP2017/024152, filed on Jun. 30, 2017.

(30) Foreign Application Priority Data

Jul. 4, 2016 (JP) .................... 2016-132496

(51) Int. Cl.
G06K 19/07 (2006.01)
G06F 21/32 (2013.01)
G06F 21/62 (2013.01)

(52) U.S. Cl.
CPC ......... *G06K 19/0718* (2013.01); *G06F 21/32* (2013.01); *G06F 21/62* (2013.01)

(58) Field of Classification Search
CPC ...... G06K 19/0718; G06F 21/32; G06F 21/62
See application file for complete search history.

(56) References Cited

U.S. PATENT DOCUMENTS

| 5,869,822 A | * | 2/1999 | Meadows, II | ..... G06K 9/00067 235/380 |
| 6,002,785 A | * | 12/1999 | Ucida | ................ G06K 9/00087 340/5.83 |

(Continued)

FOREIGN PATENT DOCUMENTS

| JP | 2003167606 A | * | 6/2003 |
| JP | 2009080771 A | * | 4/2009 |
| JP | 2010-250475 | | 11/2010 |

OTHER PUBLICATIONS

International Search Report dated Sep. 19, 2017 in PCT/JP2017/024152, filed on Jun. 30, 2017.

*Primary Examiner* — Daniel I Walsh
(74) *Attorney, Agent, or Firm* — Oblon, McClelland, Maier & Neustadt, L.L.P.

(57) ABSTRACT

According to an embodiment, the IC card includes a communication unit, a verification rate acquisition unit, a setting unit, a reception processing unit, and a determination unit. The communication unit transmits and receives data to and from an external device. The verification rate acquisition unit acquires a verification rate of biometric information. The setting unit selects a security level corresponding to the verification rate from a plurality of security levels each indicating an executable command, and sets the selected security level as the current security level. The reception processing unit receives a command through the communication unit. The determination unit determines whether or not the received command is executable on the basis of the current security level.

7 Claims, 6 Drawing Sheets

(56) References Cited

U.S. PATENT DOCUMENTS

| | | | | |
|---|---|---|---|---|
| 6,591,224 B1* | 7/2003 | Sullivan | | G06K 9/00 |
| | | | | 702/108 |
| 6,655,585 B2* | 12/2003 | Shinn | | G06K 9/00 |
| | | | | 235/382 |
| 7,137,008 B1* | 11/2006 | Hamid | | G06F 21/31 |
| | | | | 713/182 |
| 8,553,947 B2* | 10/2013 | Benini | | G06K 9/00885 |
| | | | | 382/115 |
| 8,820,647 B2* | 9/2014 | Kim | | G06K 19/0718 |
| | | | | 235/487 |
| 9,098,838 B2* | 8/2015 | Ueno | | G06Q 20/0658 |
| 2001/0026632 A1* | 10/2001 | Tamai | | G06K 9/00 |
| | | | | 382/116 |
| 2001/0048025 A1* | 12/2001 | Shinn | | G06K 9/00 |
| | | | | 235/382 |
| 2002/0016913 A1* | 2/2002 | Wheeler | | G06F 21/32 |
| | | | | 713/170 |
| 2002/0145050 A1* | 10/2002 | Jayaratne | | G06Q 20/341 |
| | | | | 235/492 |
| 2003/0051147 A1* | 3/2003 | Maeda | | G06F 21/32 |
| | | | | 713/186 |
| 2003/0115142 A1* | 6/2003 | Brickell | | G06F 21/31 |
| | | | | 705/51 |
| 2003/0172279 A1* | 9/2003 | Yudasaka | | G06K 19/07 |
| | | | | 713/176 |
| 2004/0104265 A1* | 6/2004 | Okada | | G06F 21/31 |
| | | | | 235/380 |
| 2004/0153656 A1* | 8/2004 | Cluts | | G06F 21/31 |
| | | | | 713/186 |
| 2004/0172541 A1* | 9/2004 | Ando | | G06Q 20/341 |
| | | | | 713/176 |
| 2005/0125295 A1* | 6/2005 | Tidwell | | G06Q 20/042 |
| | | | | 705/16 |
| 2005/0125296 A1* | 6/2005 | Tidwell | | G06Q 20/042 |
| | | | | 705/16 |
| 2005/0187825 A1* | 8/2005 | Kirkley | | A47F 9/046 |
| | | | | 705/18 |
| 2005/0211784 A1* | 9/2005 | Justin | | G06K 19/0718 |
| | | | | 235/492 |
| 2005/0218215 A1* | 10/2005 | Lauden | | G07C 9/00087 |
| | | | | 235/380 |
| 2005/0242921 A1* | 11/2005 | Zimmerman | | G07C 9/00031 |
| | | | | 340/5.2 |
| 2006/0000891 A1* | 1/2006 | Bonalle | | G07C 9/00103 |
| | | | | 235/380 |
| 2006/0041534 A1* | 2/2006 | Atwell | | H04L 43/0817 |
| 2006/0213986 A1* | 9/2006 | Register, Jr. | | G06K 19/04 |
| | | | | 235/382.5 |
| 2007/0039059 A1* | 2/2007 | Andoh | | G06F 21/62 |
| | | | | 726/27 |
| 2007/0096870 A1* | 5/2007 | Fisher | | E05B 19/0005 |
| | | | | 340/5.53 |
| 2007/0143225 A1* | 6/2007 | Hamilton | | G06Q 20/382 |
| | | | | 705/64 |
| 2007/0220272 A1* | 9/2007 | Campisi | | G06K 9/00006 |
| | | | | 713/186 |
| 2007/0241861 A1* | 10/2007 | Venkatanna | | G06F 21/32 |
| | | | | 340/5.52 |
| 2007/0257767 A1* | 11/2007 | Beeson | | G06K 19/0716 |
| | | | | 340/5.4 |
| 2007/0294540 A1* | 12/2007 | Wadayama | | G06Q 20/341 |
| | | | | 713/186 |
| 2008/0155268 A1* | 6/2008 | Jazayeri | | G06F 21/32 |
| | | | | 713/186 |
| 2009/0080708 A1* | 3/2009 | Mellen | | G06F 21/32 |
| | | | | 382/115 |
| 2010/0161488 A1* | 6/2010 | Evans | | G06Q 20/20 |
| | | | | 705/44 |
| 2010/0180127 A1* | 7/2010 | Li | | H04L 9/3231 |
| | | | | 713/186 |
| 2010/0332392 A1* | 12/2010 | Ueno | | G06Q 20/0658 |
| | | | | 705/44 |
| 2011/0218911 A1* | 9/2011 | Spodak | | G06Q 20/105 |
| | | | | 705/41 |
| 2012/0200389 A1* | 8/2012 | Solomon | | G06Q 10/087 |
| | | | | 340/5.52 |
| 2013/0065564 A1* | 3/2013 | Conner | | G06K 19/0718 |
| | | | | 455/414.1 |
| 2015/0137938 A1* | 5/2015 | Slaby | | G07C 9/00079 |
| | | | | 340/5.53 |
| 2015/0163063 A1* | 6/2015 | Lu | | H04L 63/0428 |
| | | | | 713/176 |
| 2015/0178346 A1* | 6/2015 | Bailey | | G06F 16/215 |
| | | | | 707/691 |
| 2015/0186710 A1* | 7/2015 | Ahn | | G06K 9/00087 |
| | | | | 382/124 |
| 2015/0186892 A1* | 7/2015 | Zhang | | G06Q 20/40145 |
| | | | | 705/44 |
| 2016/0203346 A1* | 7/2016 | Gardiner | | G06K 7/10158 |
| | | | | 235/380 |
| 2016/0277396 A1* | 9/2016 | Gardiner | | G06K 9/00087 |
| 2017/0262845 A1* | 9/2017 | Eisen | | G06Q 20/401 |
| 2018/0174013 A1* | 6/2018 | Lee | | G06K 19/07707 |
| 2018/0232739 A1* | 8/2018 | Battle | | G06Q 20/40145 |
| 2018/0276358 A1* | 9/2018 | Sawamura | | G06F 21/32 |
| 2019/0019195 A1* | 1/2019 | Dunjic | | G06K 7/0021 |
| 2019/0095771 A1* | 3/2019 | Okuno | | G06F 21/32 |

* cited by examiner

FIG. 3

| Security level | Minimum collation rate | Maximum collation rate |
|---|---|---|
| 3 | 99.5 | 100 |
| 2 | 99 | 99.5 |
| 1 | 98 | 99 |
| 0 | 0 | 98 |

FIG. 4

| Command | Minimum security level |
|---|---|
| MUTUAL AUTHENTICATE | 3 |
| GET CHALLENGE, READ BINARY | 2 |
| SELECT | 1 |

IC CARD, PORTABLE ELECTRONIC DEVICE, AND INFORMATION PROCESSING METHOD

CROSS-REFERENCE RELATED APPLICATIONS

This application is based upon and claims the benefit of priority from Japanese Patent Application No. 2016-132496 filed Jul. 4, 2016, the entire contents of which are incorporated herein by reference. This application is a continuation application of International Application No. PCT/JP2017/024152 filed on Jun. 30, 2017.

TECHNICAL FIELD

An embodiment of the invention relates to an IC card, a portable electronic system, and an information processing method.

BACKGROUND

Some portable electronic devices such as IC cards, have a fingerprint sensor. An IC card equipped with a fingerprint sensor determines that authentication has been successful if a verification rate of fingerprint data registered in advance and fingerprint data acquired from a user exceeds a predetermined threshold value.

However, the fingerprint data acquired from the user is susceptible to influence of a surrounding environment and the like, and the authentication may not be successful even if the user is the person himself/herself. Conventionally, when a verification rate does not exceed the predetermined threshold value, the IC card has a problem that an execution condition of a command is not satisfied and an expected operation is not executed.

PRIOR ART DOCUMENTS

Patent Documents

[Patent document 1] Japanese patent application publication No. 2010-250475

SUMMARY OF THE INVENTION

Problem to be Solved by the Invention

In order to solve the above problem, an IC card, a portable electronic device, and an information processing method capable of setting executable commands according to a verification rate are provided.

Means for Solving the Problem

According to an embodiment, an IC card is equipped with a communications unit, a verification rate acquisition unit, a setting unit, a reception processing unit, and a determination unit. The communication unit transmits/receives data to/from an external device. The verification rate acquisition unit acquires a verification rate of biometric information. The setting unit selects a security level corresponding to the verification rate from a plurality of security levels each level showing an executable command and sets the security level selected as a current security level. The reception processing unit receives a command through the communication unit. The determination unit determines whether the command is executable on the basis of the current security level.

BRIEF EXPLANATION OF THE DRAWINGS

FIG. 3 is a diagram showing an example of a security level table stored in the IC card according to the embodiment.

FIG. 4 is a diagram showing an example of a minimum security level table stored in the IC card according to the embodiment.

EMBODIMENT TO PRACTICE THE INVENTION

Figure 1:
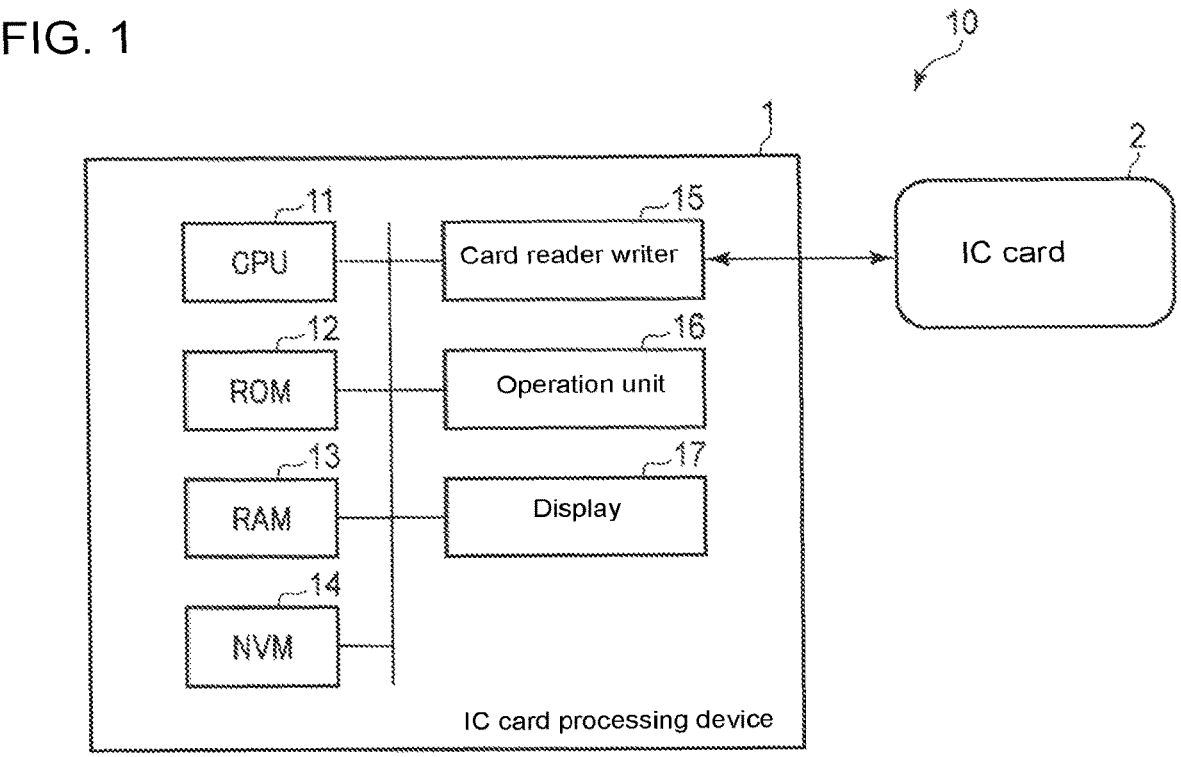
FIG. 1 is a diagram showing a configuration example of an IC card processing system having an IC card and an IC card processing unit according to the embodiment.

Hereinafter, an embodiment will be described with reference to drawings. FIG. 1 is a block diagram for explaining a configuration example of an IC card processing system 10. The IC card processing system 10 is equipped with an IC card 2 according to the embodiment and an IC card processing device 1 that communicates with the IC card 2. The IC card 2 is a portable electronic device, and the IC card processing device 1 is an external device of the IC card 2.

In the configuration example as shown in FIG. 1, the IC card processing device 1 has a CPU 11, an ROM 12, an RAM 13, an NVM 14, a card reader writer 15, an operation unit 16, a display 17, etc. These units are connected each other via a data bus. Note that in addition to the configuration as shown in FIG. 1, the IC card processing device 1 may have a configuration according to necessity or exclude a specific configuration.

The CPU 11 is a central processing unit and has a function of controlling an operation of the whole of the IC card processing device 1. The CPU 11 may be equipped with an internal cache, various kinds of interfaces, etc. The CPU 11 realizes various processes by executing the programs memorized in an internal memory, the ROM 12, or the NVM 14 in advance. For example, the CPU 11 has a function of transmitting a command to the IC card 2 by the card reader writer 15, a function of performing various processes on the basis of the data such as a response received from the IC card 2, and other function, by executing a program. Through these functions, the CPU 11 transmits to the IC card 2 via the card reader writer 15 a write command containing data input into the operation unit 16, predetermined data, or the like. Through the above operation, the CPU 11 performs control to request the IC card 2 to write the data.

Note that some of the various kinds of functions realized by the CPU 11 executing the program may be realized by a hardware circuitry. In this case, the CPU 11 controls the functions executed by the hardware circuitry.

The ROM 12 is a nonvolatile memory in which programs for control, control data, etc. are stored in advance. The control program and the control data stored in the ROM 12 are incorporated in advance in accordance with specifications of the IC card processing device 1. The ROM 12 stores, for example, a program (for example, BIOS) for controlling a circuit board of the IC card processing device 1.

The RAM 13 is a volatile memory. The RAM 13 temporarily stores data under processing of the CPU 11 and the like. The RAM 13 stores various application programs on the basis of instructions from the CPU 11. Furthermore, the RAM 13 may store data necessary for executing the application program, an execution result of the application program, and the like.

The NVM 14 is a data-writable and rewritable nonvolatile memory. The NVM 14 is composed of, for example, a hard disk drive (HDD), a solid state drive (SSD), an EEPROM (registered trademark), or a flash memory. The NVM 14 stores control programs, applications, and various data according to an operational application of the IC card processing device 1.

The card reader writer 15 is an interface device for transmitting and receiving data to and from the IC card 2. The card reader writer 15 is composed of an interface corresponding to a communication method of the IC card 2. For example, when the IC card 2 is a contact-type IC card, the card reader writer 15 is composed of a contact portion for physically and electrically connecting with a contact portion of the IC card 2.

When the IC card 2 is a non-contact type IC card, the card reader writer 15 is composed of an antenna and a communication control unit for performing wireless communication with the IC card 2. The card reader writer 15 is configured to perform electric power supply, clock supply, reset control, and data transmission and reception to the IC card 2.

With such functions, on the basis of control of the CPU 11, the card reader writer 15 performs the electric power supply to the IC card 2, activation (start-up) of the IC card 2, the clock supply, the reset control, the transmission of various commands, and the reception of a response (a response) to the command transmitted, etc.

To the operation unit 16, various operational instructions are input by an operator of the IC card processing device 1. The operation unit 16 transmits data of the operational instruction input by the operator to the CPU 11. The operation unit 16 is, for example, a keyboard, a ten-key pad, a touch panel, or the like.

A display 17 is a display device that displays various information under the control of the CPU 11. The display 17 is, for example, a liquid crystal monitor or the like. Note that the display 17 may be integrally formed with the operation unit 16.

Next, the IC card 2 will be described.

The IC card 2 is configured to be activated (to become ready to operate) by being supplied with electric power and the like from the external device such as the IC card processing device 1. The IC card 2 may perform contact type communication with the IC card processing device 1 or may perform non-contact type communication with the IC card processing apparatus 1.

Figure 2:
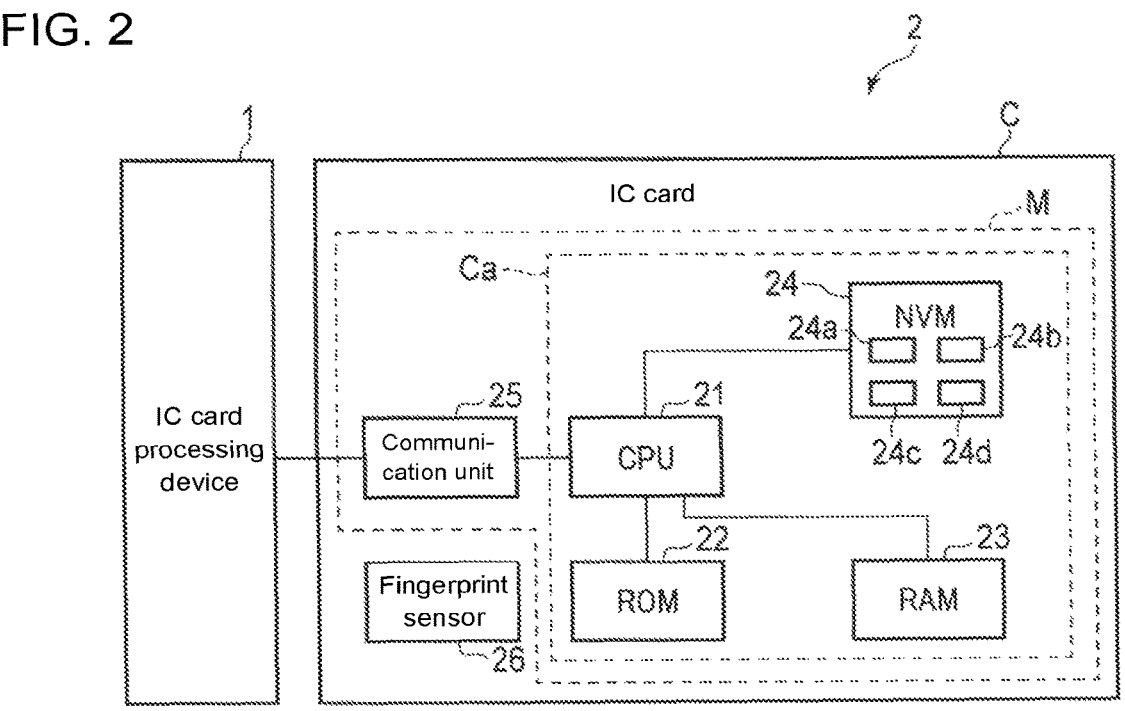
FIG. 2 is a block diagram showing a configuration example of the IC card according to the embodiment.

Next, a configuration example of the IC card 2 will be described. FIG. 2 is a block diagram schematically showing a configuration example of the IC card 2 according to the embodiment.

The IC card 2 has a card-like main body C made of plastic or the like. As for the IC card 2, a module M is built in the main body C. As for the module M, in a state where the IC chip Ca and the external interface (for example, the communication unit 25) as the communication unit are connected, the IC chip Ca and an external interface are integrally formed, and the module M is buried in the main body C of the IC card 2.

In the configuration example shown in FIG. 2, the IC card 2 includes the module M, a fingerprint sensor 26, etc. The module M includes the communication unit 25, the IC chip Ca, etc. The IC chip Ca includes the CPU 21, the ROM 22, the RAM 23, the NVM 24 and the like. The ROM 22, the RAM 23 and the NVM 24 are collectively referred to as memory.

These units are connected to each other via a data bus. Note that as for the IC card 2 a necessary configuration may be appropriately added or an unnecessary configuration may be deleted.

The CPU 21 is a central processing unit, and functions as a control unit that controls the entire IC card 2. The CPU 21 performs various processes on the basis of a control program and control data stored in the ROM 22 or the NVM 24. For example, the CPU 21 executes a program stored in the ROM 22 to perform various operations according to the operation control of the IC card 2 or the operation mode of the IC card 2.

Note that some of the various kinds of functions realized by the CPU 21 executing the program may be realized by a hardware circuitry. In this case, the CPU 21 controls the functions executed by the hardware circuitry.

The ROM 22 is a nonvolatile memory that stores programs for control and control data in advance. The ROM 22 is incorporated in the IC card 2 in a state where the control programs, the control data and the like are stored at a manufacturing stage. That is, the control programs and the control data stored in the ROM 22 are incorporated in advance in accordance with specifications of the IC card 2 or the like.

The RAM 23 is a volatile memory. The RAM 23 temporarily stores data under processing of the CPU 21 and the like. For example, the RAM 23 functions as a calculation buffer, a reception buffer, and a transmission buffer. The calculation buffer temporarily holds results of various arithmetic processing executed by the CPU 21 and the like. The reception buffer holds command data and the like received from the IC card processing device 1 via the communication unit 25. The transmission buffer holds messages (response data) and the like to be transmitted to the IC card processing device 1 via the communication unit 25.

The NVM 24 is composed of a data-writable and rewritable nonvolatile memory such as an EEPROM (registered trademark) or a flash ROM. The NVM 24 stores a control program, an application, and various data according to the application of the IC card 2. For example, in the NVM 24, program files, data files, and the like are created. In each created file, a control program and various data are written.

Furthermore, the NVM 24 includes a storage area 24*a* for storing a security level table, a storage area 24 *b* (a first storage unit) for storing a minimum security level table, a storage area 24*c* for storing a low verification rate counter, and a storage area 24*d* (a second storage unit) for storing a history of verification rate. The security level table, the minimum security level table, the low verification rate counter and the verification rate will be described later.

The communication unit 25 is an interface for transmitting and receiving data to and from the IC card processing device 1. That is, the communication unit 25 is the interface for performing communication with the card reader writer 15 of the IC card processing device 1. When the IC card 2 is realized as a contact type IC card, the communication unit 25 is composed of a communication control unit and a contact portion for physically and electrically contacting with the card reader writer 15 of the IC card processing device 1 and transmitting and receiving a signal. For example, the IC card 2 is activated by receiving supply of the operation electric power and the operation clock from the IC card processing device 1 via the contact portion.

When the IC card 2 is realized as a contactless type IC card, the communication unit 25 is composed of a communication control unit such as a modulation and demodulation circuit for performing wireless communication with the card reader writer 15 of the IC card processing device 1, and an antenna. For example, the IC card 2 receives radio waves from the IC card processing device 1 via the antenna, the modulation and demodulation circuit, etc. The IC card 2 generates the operation electric power and the operation clock from the radio waves by an electric power supply unit (not shown), and is activated.

The fingerprint sensor 26 (a biometric information acquisition unit) acquires biometric information on the basis of various features of a human-beings' biological body. For example, the fingerprint sensor 26 acquires fingerprint data as the biometric information from a user's finger (the human-beings' biological body). For example, the fingerprint data is data indicating feature of the fingerprint of the user possessing the IC card 2. The fingerprint sensor 26 acquires an image of the fingerprint and generates fingerprint data from the acquired fingerprint image.

Furthermore, the fingerprint sensor 26 has an internal memory in which fingerprint data is stored in advance. The fingerprint sensor 26 calculates a verification rate between the fingerprint data acquired from the human-beings' biological body and the fingerprint data stored in the internal memory. For example, the fingerprint sensor 26 calculates a concordance rate between the fingerprint data acquired from the human-beings' biological body and the fingerprint data stored in the internal memory as the verification ratio. A method for calculating the concordance rate between the fingerprint data acquired from the human-beings' biological body and the fingerprint data stored in the internal memory may be, for example, a feature point method, a relation method, or other known methods.

Furthermore, the fingerprint sensor 26 transmits a command storing the verification rate to the CPU 11. For example, the fingerprint sensor 26 transmits to the CPU 11 a command storing the verification rate at a predetermined timing after calculating the verification rate.

Next, the security level table will be described.

FIG. 3 shows a configuration example of the security level table.

As shown in FIG. 3, the security level table stores the security level and a range of the verification rate in association with each other.

The security level indicates a security state of the IC card 2 set on the basis of the verification rate. That is, the security level indicates an executable operation in the IC card 2. Here, the security level indicates an executable command in the IC card 2.

The range of the verification rate indicates a lower limit and an upper limit of the verification ratio. In an example shown in FIG. 3, the range of the verification rate is composed of a minimum verification rate (the lower limit) and a maximum verification rate (the upper limit). For example, the minimum verification rate corresponding to the security level "3" is "99.5" and the maximum verification rate is "100". Accordingly, the security level table indicates that the range of the verification rate corresponding to the security level "3" is 99.5 or more (i.e., 99.5 to 100). Also, the minimum verification rate corresponding to the security level "2" is "99" and the maximum verification rate is "99.5". Accordingly, the security level table indicates that the range of the verification rate corresponding to the security level "2" is 99 or more and less than 99.5.

Note that in the security level table, any range of the verification rate may be associated with the security level. Furthermore, the security level table may store four or more security levels. A configuration example of the security level table is not limited to a specific configuration.

Next, the minimum security level table will be described.

FIG. 4 shows a configuration example of the minimum security level table. As shown in FIG. 4, the minimum security level table stores a command and the minimum security level at which the command can be executed in association with each other.

The command is a command that the CPU 21 of the IC card 2 can execute. For example, the command is transmitted from the IC card processing device 1.

The minimum security level is a minimum security level at which the command can be executed. That is, the minimum security level is a security level required for executing the command. For example, if the current security level is equal to or higher than the minimum security level corresponding to the predetermined command, the CPU 21 can execute the predetermined command.

For example, in the example shown in FIG. 4, when the current security level is "2", the CPU 21 can execute "GET CHALLENGE" and "READ BINARY". Furthermore, since the security level corresponding to "SELECT" is "1", the CPU 21 can also execute "SELECT".

Note that the configuration example of the minimum security level table is not limited to a specific configuration. Any combination of the command in the minimum security level table and the minimum security level may be used.

For example, an operator of the IC card processing system 10 sets the minimum security level table by combining the processing (the command) executed by the IC card 2 and the security level.

When the minimum security level table is set, the operator decides an allowable false rejection rate and false acceptance rate for each security level, and sets a range of the verification rate on the basis of the false rejection rate and the false acceptance rate. That is, the operator sets a security level table corresponding to the minimum security level table. Each of a plurality of security levels indicates an executable command by a table in which a command and the minimum security level at which the command can be executed are associated with each other.

In the above description, the minimum security level table is set, but in the present invention, without setting the minimum security level table, processing (command) which the IC card can execute may be associated with each security level in the security level table.

Figure 8:
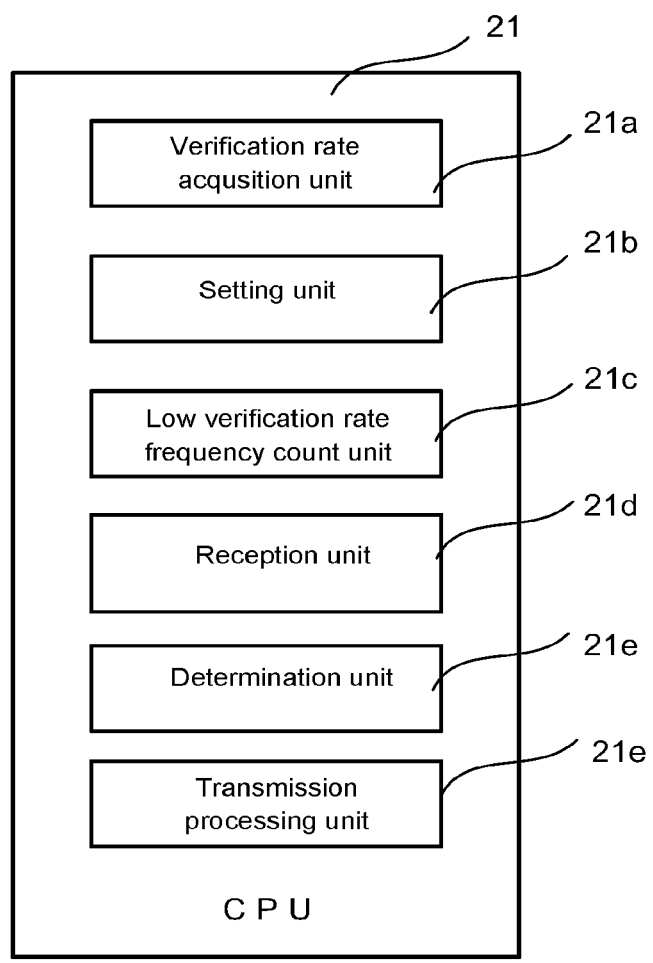
FIG. 8 is a diagram showing functions realized by a CPU of the IC card according to the embodiment.

Next, the functions realized by the CPU 21 executing the program stored in the memory will be described. As shown in FIG. 8, the functions realized by the CPU 21 include, for example, a verification rate acquisition unit 21*a*, a setting unit 21*b*, a low verification rate frequency counting unit 21*c*, a reception processing unit 21*d*, a determination unit 21*e*, and a transmission processing unit 21*f*. First, the CPU 21 has a function of acquiring a verification rate of the fingerprint data (the verification rate acquisition unit 21*a*).

For example, the CPU 21 receives a command storing the verification rate of fingerprint data from the fingerprint sensor 26 through the communication unit 25. The CPU 21 extracts the verification rate from the command.

When acquiring the verification rate, the CPU 21 additionally stores the acquired verification rate in the storage area 24d of the NVM 24 in time series. That is, the CPU 21 stores the history of the verification rate in the storage area 24d. For example, the CPU 21 may cyclically store the verification rate in the storage area 24d.

Furthermore, the CPU 21 has a function of selecting (determining) the security level on the basis of the verification rate from the plurality of security levels and setting the security level selected (determined) to the current security level (the setting unit 21b).

For example, the CPU 21 acquires the security level including the verification rate within the range of the verification rate with reference to the security level table. For example, when the verification rate is 99.4, the CPU 21 acquires the security level "2". The CPU 21 stores the acquired security level as the current security level in the RAM 23.

Here, when the security level is "1" to "3", it is assumed that the authentication has succeeded. Furthermore, when the security level is "0", it is assumed that the authentication has failed.

Furthermore, the CPU 21 has a function of counting the number of times the security level equal to or lower than the predetermined security level is set to the current security level (the low verification rate frequency counting unit 21c). That is, when setting the security level equal to or lower than the predetermined security level to the current security level, the CPU 21 counts up the low verification rate counter.

For example, when setting the security level equal to or lower than the predetermined security level to the current security level even though the authentication has succeeded, the CPU 21 counts up the low verification rate counter. Here, when setting the security level equal to or lower than "2" to the current security level (that is, when the current security level is "1" or "2"), the CPU 21 counts up the low verification rate counter.

Furthermore, the CPU 21 has a function of receiving a command from the IC card processing device 1 (the reception processing unit 21d). For example, the CPU 21 receives a command from the card reader writer 15 of the IC card processing device 1 through the communication unit 25.

Furthermore, the CPU 21 has a function of determining whether the received command is executable on the basis of the current security level (the determination unit 21e).

For example, the CPU 21 acquires a minimum security level corresponding to the received command with reference to the minimum security level table. For example, when the received command is "GET CHALLENGE", the CPU 21 acquires "2" as the minimum security level.

The CPU 21 compares the current security level stored in the RAM with the acquired minimum security level. When the current security level is equal to or higher than the minimum security level, the CPU 21 determines that the command can be executed. Furthermore, when the current security level is not equal to or higher than the minimum security level, the CPU 21 determines that the command cannot be executed.

Furthermore, when the verification rate is decreasing, the CPU 21 has a function of transmitting a notification to the IC card processing device 1 indicating that the verification rate has decreased through the communication unit 25 (the transmission processing unit 21f).

For example, when executing the command, the CPU 21 determines whether the verification rate tends to decrease with reference to the history of the verification rate stored in the storage area 24d. For example, the CPU 21 determines whether the count value of the low verification rate counter exceeds a predetermined threshold value.

When the count value of the low verification rate counter exceeds the predetermined threshold value, the CPU 21 transmits a notification indicating that the verification rate has decreased as a response to the IC card processing device 1. That is, the CPU 21 generates a response indicating an execution result of the command and the decrease in the verification rate, and transmits the response to the IC card processing device 1.

Note that when determining that the command is not executable, the CPU 21 may determine whether the verification rate is decreasing. A timing at which the CPU 21 determines whether or not the verification rate is decreasing and transmits a notification indicating that the verification rate has decreased is not limited to a specific timing.

In addition, as the notification indicating that the verification rate has decreased, the CPU 21 may transmit a notification prompting to update the fingerprint data or a notification indicating that the fingerprint sensor 26 may be damaged.

Next, functions realized by the CPU 11 of the IC card processing device 1 will be described.

When receiving the notification indicating that the verification rate has decreased from the IC card 2 through the card reader writer 15, the CPU 11 presents a predetermined information. For example, the CPU 11 displays a message or the like indicating that the verification rate of the IC card 2 has decreased through the display 17. Furthermore, the CPU 11 may display on the display 17 a message prompting to update the fingerprint data, a message prompting to exchange the IC card 2, or the like.

Next, an operation example of the IC card processing system 10 will be described.

Figure 5:
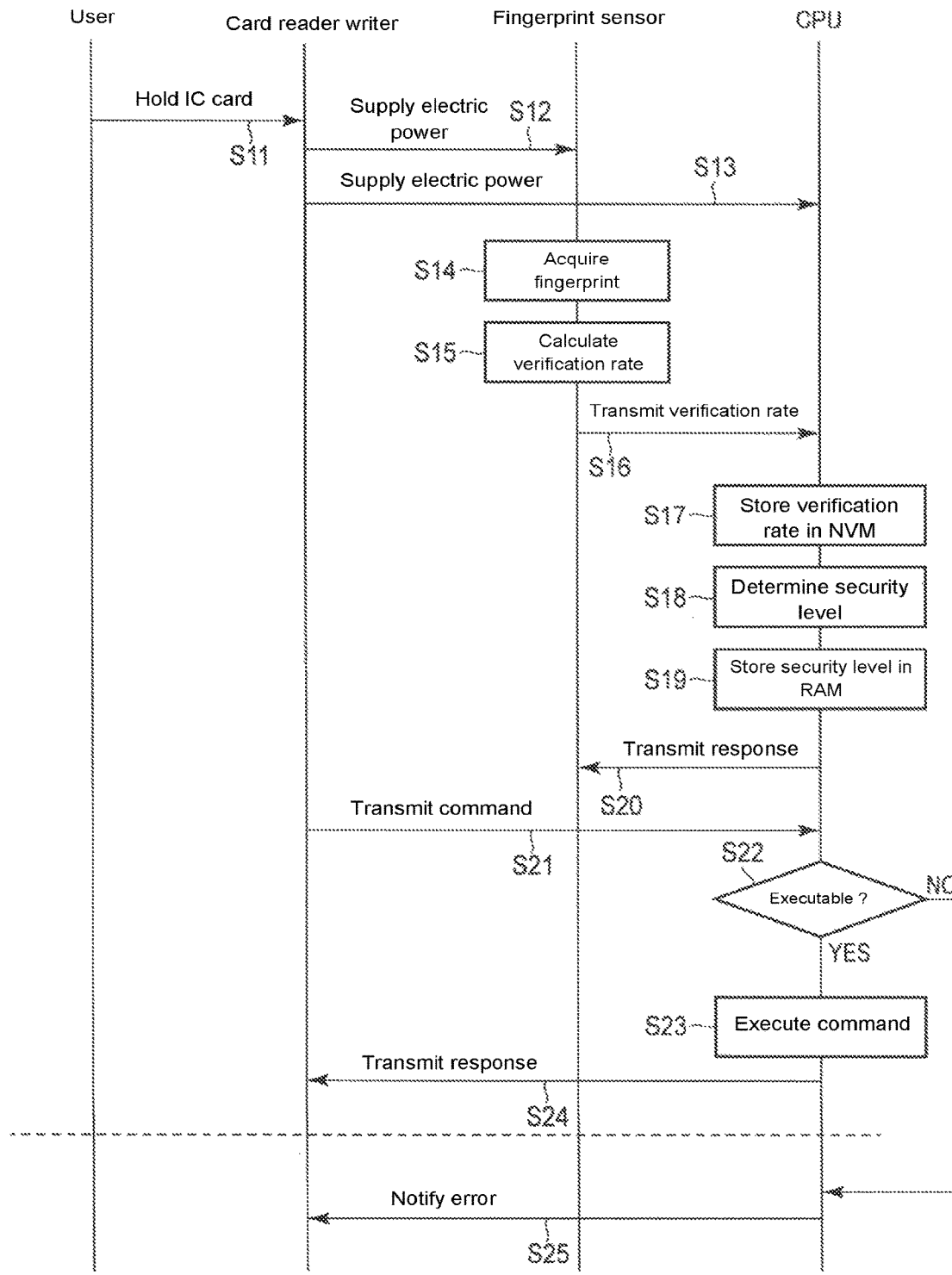
FIG. 5 is a sequence diagram showing an operation example of the IC card processing system according to the embodiment.

FIG. 5 is a sequence diagram for explaining an operation example of the IC card processing system 10.

First, a user holding the IC card 2 holds the IC card 2 over the card reader writer 15 (S11). Note that the user may set the IC card 2 in a predetermined insertion slot.

When the user holds the IC card 2 over the card reader writer 15, the card reader writer 15 supplies electric power to the fingerprint sensor 26 (S12), and supplies electric power to the CPU 21 (S13). Note that the IC chip Ca supplied with the electric power from the card reader writer 15 may supply the electric power to the fingerprint sensor 26.

Here, it is assumed that the user brings a finger into contact with the fingerprint sensor 26.

When the card reader writer 15 supplies the electric power to the CPU 21, the fingerprint sensor 26 acquires fingerprint data of the user (S14). When acquiring the fingerprint data, the fingerprint sensor 26 calculates a verification rate (S15). When calculating the verification rate, the fingerprint sensor 26 transmits the verification rate to the CPU 21 (S16).

The CPU 21 receives the verification rate from the fingerprint sensor 26. When receiving the verification rate, the CPU 21 stores the verification rate as a history in the storage area 24d (S17). When storing the verification rate, the CPU 21 determines the security level on the basis of the verification rate (S18). When determining the security level, the CPU 21 stores the determined security level as the current security level in the RAM 23 (S19).

When storing the determined security level in the RAM 23, the CPU 21 transmits a predetermined response to the fingerprint sensor 26 (S 20). When transmitting the response to the fingerprint sensor 26, the CPU 21 waits until receiving a command from the card reader writer 15.

The card reader writer 15 transmits a predetermined command to the IC card 2 on the basis of a signal from the CPU 11 (S21).

The CPU 21 receives the command. When receiving the command, the CPU 21 determines whether the command can be executed on the basis of the current security level (S22). That is, the CPU 21 determines whether the current security level is equal to or higher than the minimum security level corresponding to the command.

When determining that the command is executable (S22, YES), the CPU 21 executes the command (S23).

When executing the command, the CPU 21 transmits a response indicating an execution result of the command to the card reader writer 15 (S24).

When the card reader writer 15 receives the response, the IC card processing system 10 ends the operation.

When it is determined that the command is not executable (S22, NO), the CPU 21 transmits an error notification to the card reader writer 15 indicating that the command cannot be executed (S25). When the card reader writer 15 receives the error notification, the IC card processing system 10 ends the operation.

Next, an operation example of the CPU 21 of the IC card 2 will be described. First, an operation example in which the CPU 21 sets the current security level will be described.

Figure 6:
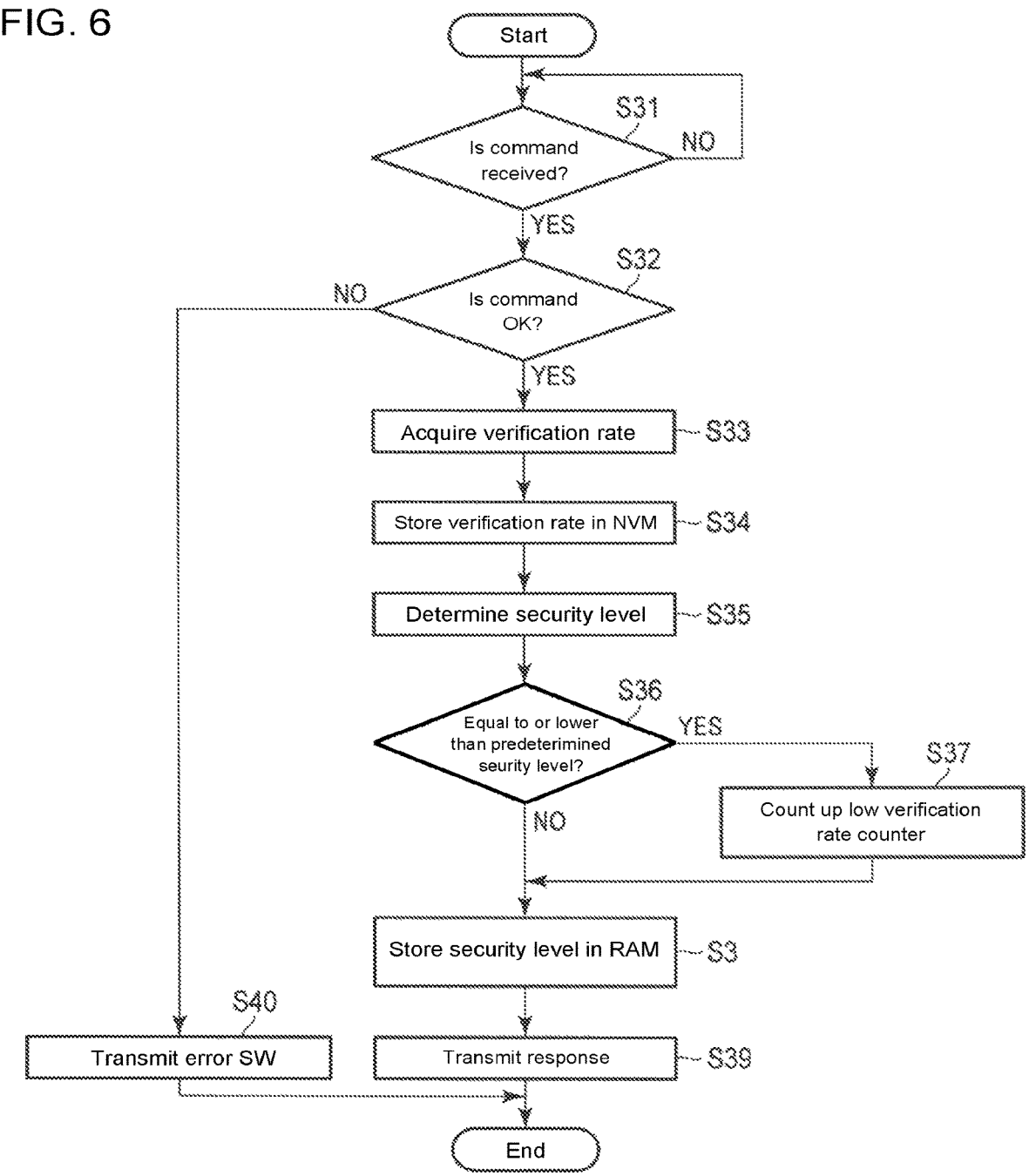
FIG. 6 is a flow chart showing an operation example of the IC card according to the embodiment.

FIG. 6 is a flow chart for explaining an operation example in which the CPU 21 sets the current security level.

First, the CPU 21 determines whether or not a command has been received from the fingerprint sensor 26 (S31). When it is determined that the command has not been received (S31, NO), the CPU 21 returns to S31.

When it is determined that the command has been received (S31, YES), the CPU 21 determines whether the command is appropriate (S32). For example, the CPU 21 checks a redundancy code or the like and determines whether or not the command is damaged.

When it is determined that the command is appropriate (S32, YES), the CPU 21 acquires the verification rate from the command (S33). When acquiring the verification rate, the CPU 21 stores the verification rate as a history in the storage area 24d (S34) (corresponding to S17).

When storing the verification ratio in the storage area 24d, the CPU 21 determines the security level on the basis of the verification rate (S35) (corresponding to S18). When determining the security level, the CPU 21 determines whether the determined security level is equal to or lower than a predetermined security level (for example, 1 or 2) (S36). When determining that the determined security level is equal to or lower than the predetermined security level (S36, YES), the CPU 21 counts up the low verification rate counter stored in the storage area 24c (S37).

When determining that the determined security level is not equal to or lower than the predetermined security level (S36, NO) or counting up the low verification rate counter (S37), the CPU 21 stores the determined security level as the current security level in the RAM 23 (S38) (corresponding to S19). That is, the CPU 21 sets the determined security level to the current security level.

When storing the determined security level in the RAM 23, the CPU 21 transmits a predetermined response to the fingerprint sensor 26 (S39) (corresponding to S20).

When determining that the command is not appropriate (S32, NO), the CPU 21 transmits a response including an SW indicating an error to the fingerprint sensor 26 (S40).

When transmitting the response to the fingerprint sensor 26 (S39), or when transmitting the response including the SW indicating the error to the fingerprint sensor 26 (S40), the CPU 21 ends the operation.

Next, an operation example when the CPU 21 receives a command from the card reader writer 15 will be described.

Figure 7:
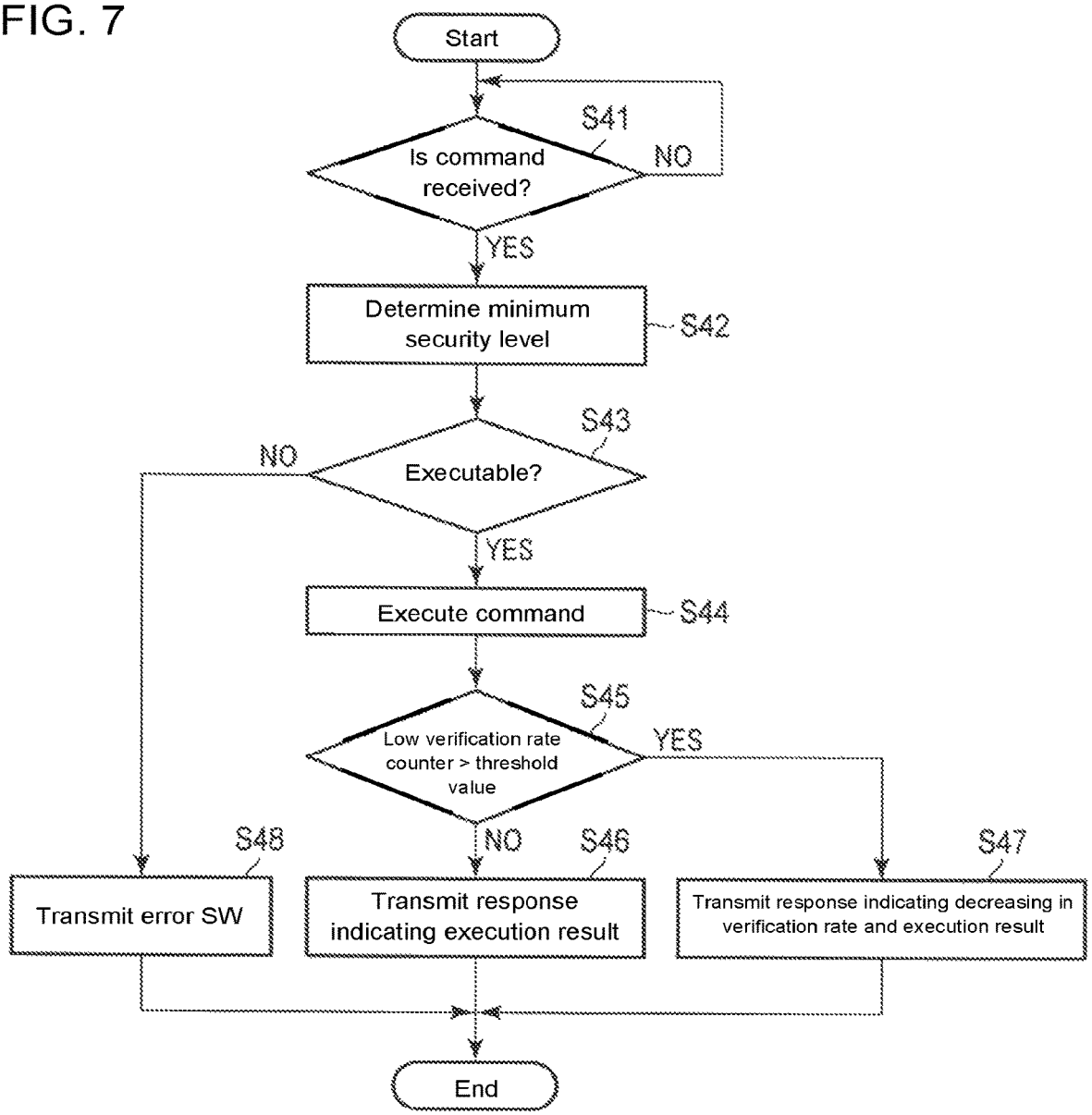
FIG. 7 is a flow chart showing an operation example of the IC card according to the embodiment.

FIG. 7 is a flow chart for explaining the operation example when the CPU 21 receives the command from the card reader writer 15.

First, the CPU 21 determines whether the command has been received from the card reader writer 15 (S41). When determining that the command has not been received from the card reader writer 15 (S41, NO), the CPU 21 returns to S41.

When determining that the command has been received from the card reader writer 15 (S41, YES), the CPU 21 determines the minimum security level corresponding to the received command (S42) (corresponding to S22).

When determining the minimum security level, the CPU 21 determines whether the received command is executable on the basis of the minimum security level (S43) (corresponding to S22). That is, the CPU 21 determines whether the current security level is equal to or larger than the minimum security level.

When determining that the received command is executable (S43, YES), the CPU 21 executes the received command (S44) (corresponding to S23). When executing the command, the CPU 21 determines whether the low verification rate counter is larger than the predetermined threshold value (S45).

When determining that the low verification rate counter is not larger than the predetermined threshold value (S45, NO), the CPU 21 transmits a response indicating an execution result of the command to the card reader writer 15 through the communication unit 25 (S 46) (corresponding to S24).

When determining that the low verification rate counter is larger than the predetermined threshold value (S45, YES), the CPU 21 transmits a response indicating the decrease in the verification rate and the execution result to the card reader writer 15 through the communication unit 25 (S47) (corresponding to S24).

When determining that the received command is not executable (S43, NO), the CPU 21 transmits a response including the SW indicating that execution of the command is impossible to the card reader writer 15 through the communication unit 25 (S48) (corresponding to S25).

When the response indicating the execution result of the command is transmitted to the card reader writer 15 (S46), when the response indicating the decrease in the verification rate and the execution result is transmitted to the card reader writer 15 (S47), or when the response including an SW indicating that the execution of the command is impossible is transmitted to the card reader writer 15 (S48), the CPU 21 ends the operation.

Note that the CPU 21 may perform S34 at any timing after S34.

Furthermore, the CPU 21 may receive fingerprint data of the user from the IC card processing device 1. For example, the IC card processing device 1 includes a fingerprint sensor that acquires fingerprint data. The CPU 21 acquires the fingerprint data from the IC card processing device 1. The CPU 21 may compare the acquired fingerprint data with the fingerprint data stored in the NVM 24 or the like in advance to calculate the verification rate.

Furthermore, the CPU 21 may acquire a verification rate using other biometric information instead of the fingerprint data. For example, the CPU 21 may acquire a verification rate using biometric information of the human-beings' biological body such as an iris or a vein. The biometric information is not limited to a specific configuration.

The IC card configured as described above set the security level according to the verification rate of the biometric information. In addition, the IC card sets executable commands according to the current security level. Therefore, the IC card can set the executable commands according to the verification rate. As a result, the IC card can operate flexibly according to the verification rate even when the verification rate decreases.

In addition, the IC card stores the verification rate as a history. Therefore, the operator of the IC card processing system can check the variation of the verification rate. As a result, the operator can set the range of the verification rate corresponding to the security level for each user. For example, the operator acquires the history of the verification rate at the time of card exchange or the like. The operator can set an appropriate range of the verification rate for the user from the transition of the verification rate.

Furthermore, the IC card processing device may acquire the history of the verification rate from the IC card.

The IC card processing device determines, from the history of the acquired verification rate, whether the security level set in association with the verification rate in the IC card is appropriate (that is, whether the range of the verification rate for each security level is appropriate), and rewrites the security level table.

While several embodiments of the present invention have been described, these embodiments have been presented by way of example and are not intended to limit the scope of the invention. These novel embodiments can be implemented in various other forms, and various omissions, substitutions and changes can be made without departing from the spirit of the invention. These embodiments and modifications thereof are included in the scope and gist of the invention and are included in the invention described in the claims and the equivalent scope thereof.

What is claimed is:

1. An integrated circuit (IC) card comprising:
  a communication interface which transmits and receives data to and from a device external to the IC card;
  an on-card biometric sensor which acquires biometric information from a user and calculates a coincidence rate between the biometric information acquired and biometric information registered in advance as a verification rate;
  a first storage which stores a minimum security level table in which a plurality of different commands and a corresponding minimum security level at which each of the different commands can be executed are associated with each other; and
  circuitry programmed to:
  acquire the verification rate from the biometric sensor;
  select a security level corresponding to the verification rate from a plurality of security levels with reference to a security level table which stores a security level and a range of the verification rate in association with each other;
  set the security level selected as a current security level;
  store the current security level in a memory;
  receive a command from the device through the communication interface;
  determine a minimum security level corresponding to the command received with reference to the minimum security level table stored in the first storage;
  compare the current security level stored in the memory with the minimum security level corresponding to the command received;
  determine whether or not the command received is executable; and
  execute the command received when the command received is determined to be executable.

2. The IC card according to claim 1, wherein the circuitry is programmed to determine that the command received is executable when the current security level is equal to or higher than a minimum security level at which the command received can be executed.

3. The IC card according to claim 1, wherein the biometric information is fingerprint data.

4. The IC card according to claim 1, further comprising a second storage which stores the verification rate as a history.

5. The IC card according to claim 4, wherein the circuitry is further programmed to transmit a predetermined notice to the device through the communication interface when the verification rate is decreasing.

6. An information processing method performed by circuitry in an integrated circuit (IC) card, the method comprising:
  acquiring biometric information from a user via an on-card biometric sensor;
  calculating a coincidence rate between the biometric information acquired and biometric information registered in advance as a verification rate;
  selecting a security level corresponding to the verification rate from a plurality of security levels with reference to a security level table which stores a security level and a range of the verification rate in association with each other;
  setting the security level selected as a current security level;
  storing the current security level in a memory;
  receiving a command from a device external to the IC card;
  determining a minimum security level corresponding to the command received with reference to a minimum security level table, stored in a first storage, in which a plurality of different commands and a corresponding minimum security level at which each of the different commands can be executed are associated with each other;
  comparing the current security level stored in the memory with the minimum security level corresponding to the command received;
  determining whether or not the command received is executable on the basis of the current security level; and
  executing the command received when the command received is determined to be executable.

7. An integrated circuit (IC) card comprising:
  a communication interface which transmits and receives data to and from a device external to the IC card;
  an on-card biometric sensor which acquires biometric information from a user;
  a first storage which stores a minimum security level table in which a plurality of different commands and a corresponding minimum security level at which each of the different commands can be executed are associated with each other; and
  circuitry programmed to:
  acquire the biometric information from the biometric sensor;

calculate a coincidence rate between the biometric information acquired and biometric information registered in advance as a verification rate;

select a security level corresponding to the verification rate from a plurality of security levels with reference to a security level table which stores a security level and a range of the verification rate in association with each other;

set the security level selected as a current security level; store the current security level in a memory;

receive a command from the device through the communication interface; determine a minimum security level corresponding to the command received with reference to the minimum security level table stored in the first storage;

compare the current security level stored in the memory with the minimum security level corresponding to the command received;

determine whether or not the command received is executable; and execute the command received when the command received is determined to be executable.

* * * * *